June 12, 1951  E V ROBNETT, JR  2,556,485
SPEED GOVERNOR FOR ENGINES

Filed June 24, 1947  5 Sheets-Sheet 2

Inventor

E V Robnett, Jr.

By *Clarence A.O'Brien*
*and Harvey B. Jacobson*
Attorneys

June 12, 1951 E V ROBNETT, JR 2,556,485
SPEED GOVERNOR FOR ENGINES
Filed June 24, 1947 5 Sheets-Sheet 3

Inventor

E V Robnett, Jr.

By Clarence A O'Brien
and Harvey B. Jacobson
Attorneys

June 12, 1951 E V ROBNETT, JR 2,556,485
SPEED GOVERNOR FOR ENGINES
Filed June 24, 1947 5 Sheets-Sheet 4
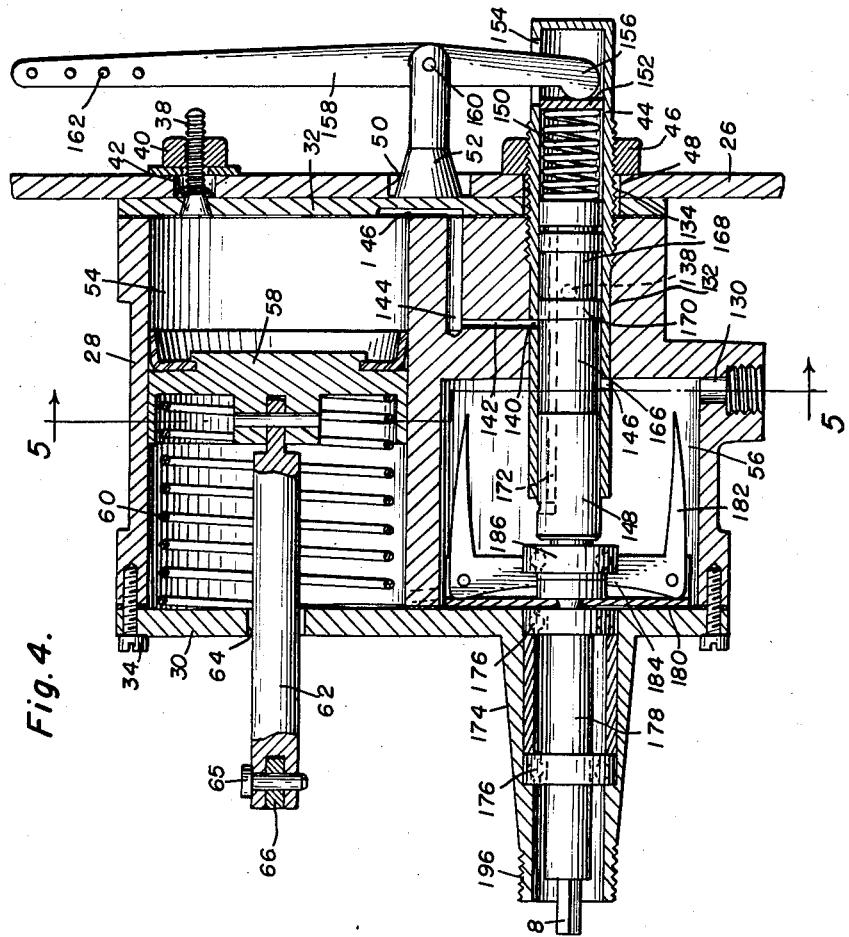
Fig. 4.
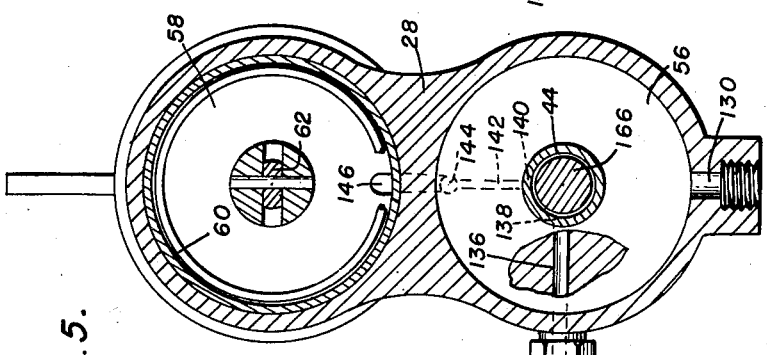
Fig. 5.
Inventor
E V Robnett, Jr.
By Clarence A. O'Brien
and Harvey B. Jacobson
Attorneys June 12, 1951  E V ROBNETT, JR  2,556,485
SPEED GOVERNOR FOR ENGINES Filed June 24, 1947  5 Sheets-Sheet 5

Inventor

E V Robnett, Jr.

By Clarence A. O'Brien
and Harvey B. Jacobson
Attorneys

Patented June 12, 1951

2,556,485

UNITED STATES PATENT OFFICE 2,556,485

SPEED GOVERNOR FOR ENGINES

E. V. Robnett, Jr., Scott Field, Ill., assignor to Auto Cruz Corporation, Austin, Tex., a corporation of Texas Application June 24, 1947, Serial No. 756,732

7 Claims. (Cl. 123—103)

This invention comprises novel and useful improvements in a speed governor for engines and more specifically pertains to an automatic speed governor for regulating the speed of the engines of automotive vehicles.

The principal object of this invention is to provide an apparatus which may be conveniently and readily attached to all makes of automobiles for regulating the position of the butterfly or throttle valve to thereby maintain a predetermined, adjustable and constant speed of operation of the engine and vehicle.

A further important purpose of the invention is to provide a mechanism in accordance with the preceding objects wherein the various functions of the apparatus shall be performed by power derived from various conventional components or accessories of an engine and automotive vehicle.

Another important object resides in developing an apparatus in conformity with the preceding objects wherein an improved mechanism is provided for temporarily eliminating operation of the governor during certain particular conditions of operation of an automotive vehicle.

Yet another important purpose of the invention resides in providing an improved power operated fluid pressure actuated means for performing the functions of the device.

And still another important object of the invention resides in providing a novel and improved mechanism actuatable by conventional vehicle brake mechanism for rendering the governor apparatus inoperative during actuation of the brakes.

Still another purpose of the invention resides in providing a novel, improved and conveniently located manual means for adjusting the speed range of operation of the engine under the control of the governor.

And a final important purpose of the invention to be specifically enumerated herein resides in providing a device of compact, simple, durable and economical construction, and yet highly efficient for the purposes intended.

These, together with various ancillary objects of the invention, which will later become apparent as the following description proceeds, are attained by this device, a preferred embodiment of which has been illustrated, by way of example only in the accompanying drawings, wherein:

Figure 4 is a longitudinal vertical sectional view taken substantially upon the plane of the section line 4—4 of Figure 3;

Figure 5 is a vertical transverse sectional view taken substantially upon the plane of the section line 5—5 of Figure 4;

Figure 7 is a vertical transverse sectional view through a portion of the mechanism;

Figure 8 is a group perspective view of some of the elements shown in Figure 7; and Figure 9 is a horizontal sectional view taken substantially upon the plane of the section line 9—9 of Figure 7.

Figure 1:
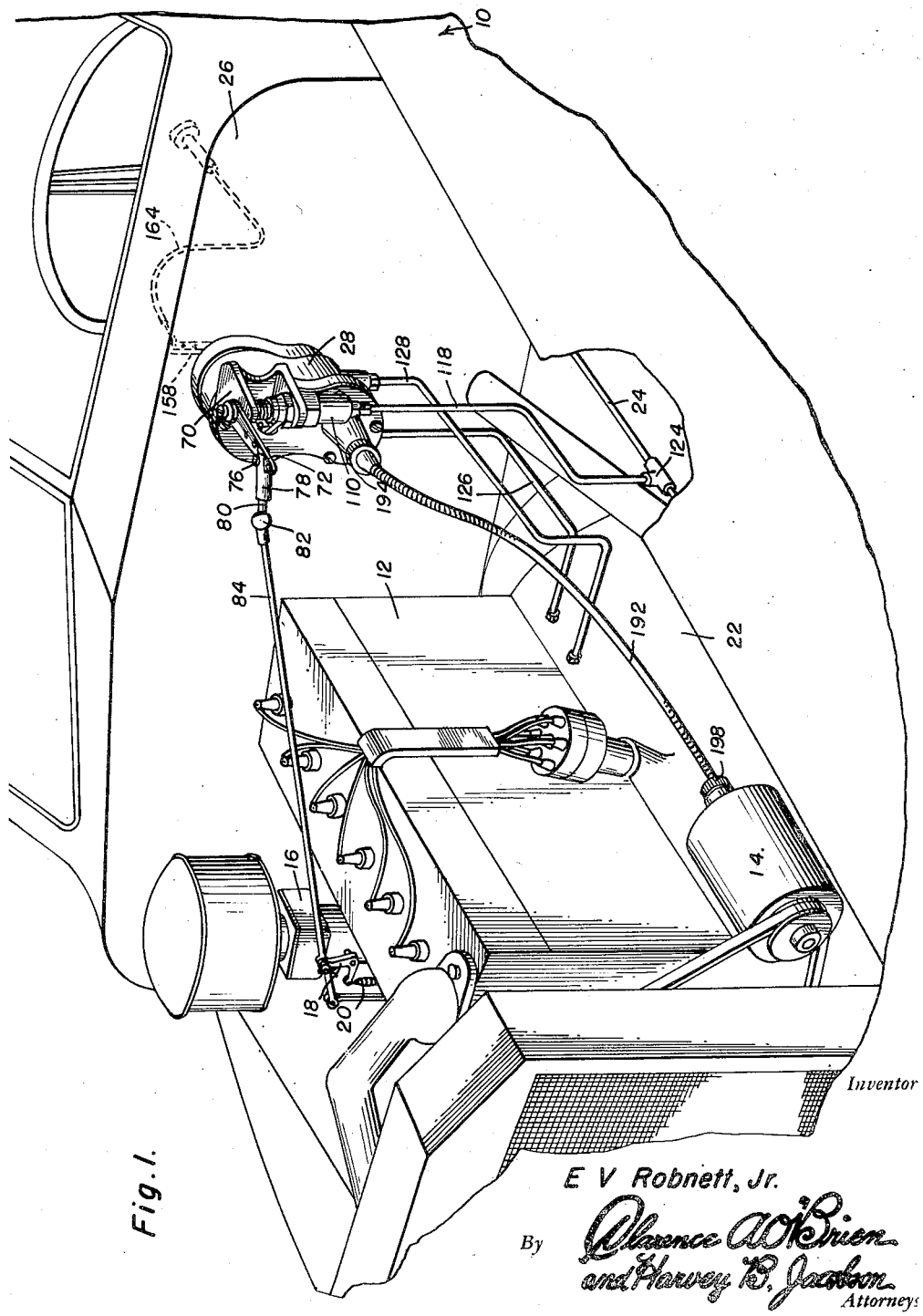
Figure 1 is a perspective view showing the apparatus attached to a conventional type of automobile engine and vehicle.

Referring now more specifically to the annexed drawings, wherein like numerals designate similar parts throughout the various views, 10 designates a portion of the automotive vehicle of any suitable type, having an engine 12, a generator 14 driven by the engine fan belt in any conventional arrangement as indicated at Figure 1, a carburetor designated at 16 and having a throttle or butterfly control valve operated in accordance with known design by a bell crank 18 which is biased to its closed position by a spring 20. The engine is shown provided with a crank case 22 and the vehicle is provided preferably with hydraulic brake actuating mechanism, one of the hydraulic fluid pressure lines being indicated at 24.

As so far described, there is indicated a conventional automotive vehicle and engine which may be of any suitable type, and which has been shown as provided with hydraulic brakes, although it will be readily understood that the principles of the invention may be employed in any other brake system desired. At any convenient spot under the hood of the automobile vehicle, as for instance upon the dashboard 26, is mounted the casing 28 of the speed governing attachment forming the subject of this invention.

Figures 3, 6:
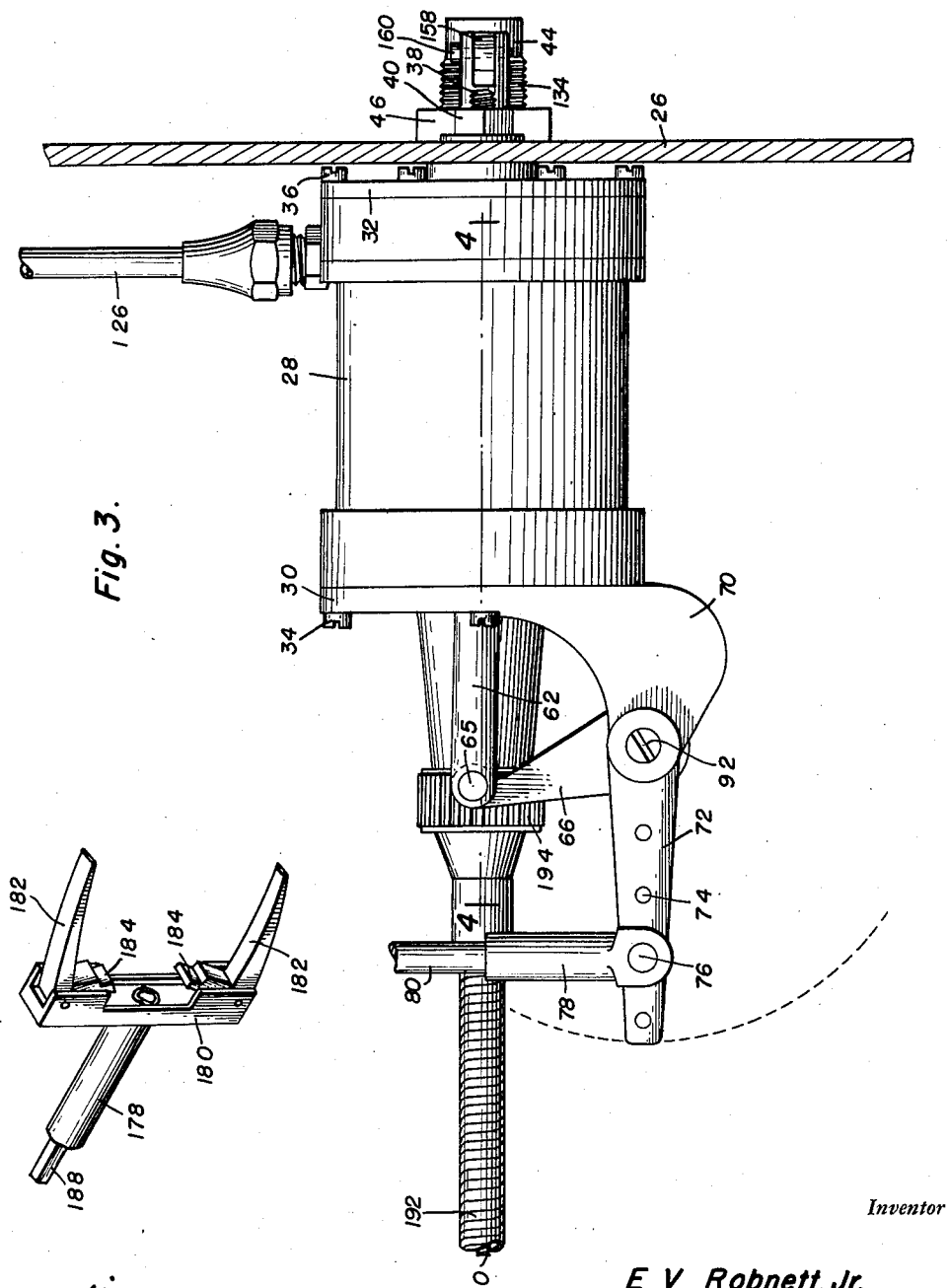
Figure 3 is a top plan view of the device, a portion of the dash upon which the same is mounted being shown in section.
Figure 6 is a perspective view of a portion of the centrifugal actuating means of the device.

As shown more clearly in Figure 4, the casing 28 is of hollow construction and provided with detachable cover plates at the opposite ends thereof, as indicated at 30 and 32, the head plate 30 being detachably secured to the casing as by fastening means 34, see Figure 3, while the rear plate 32 is secured by similar fastening means 36.

The dash 26 is suitably apertured to receive and mount the casing 28, which is detachably secured to the dash as by a bolt 38 and nut 40 extending through an aperture 42, while a threaded sleeve 44 carried by the casing 28 extends through the rear plate 32, and is secured as by a lock nut 46 to the dash 26, this sleeve extending through an aperture 48. A further aperture 50 of the dash receives an integral conical boss 52 of the rear plate 32 for a purpose to be subsequently set forth.

As shown best in Figures 4 and 5, the casing 28 is provided with upper and lower cylindrical bores 54 and 56 respectively, the former receiving a piston 58 of any suitable construction and which is urged by a spring 60 positioned between the piston and the head plate 30, inwardly towards the rear plate; while a connecting rod 62 is pivotally connected to the piston and extends through an aperture 64 in the cover head plate 30, and at its outer end is suitably connected by a linkage mechanism to be subsequently set forth, with the above mentioned throttle or butterfly valve bell crank 18, for controlling the position of the latter.

Figure 2:
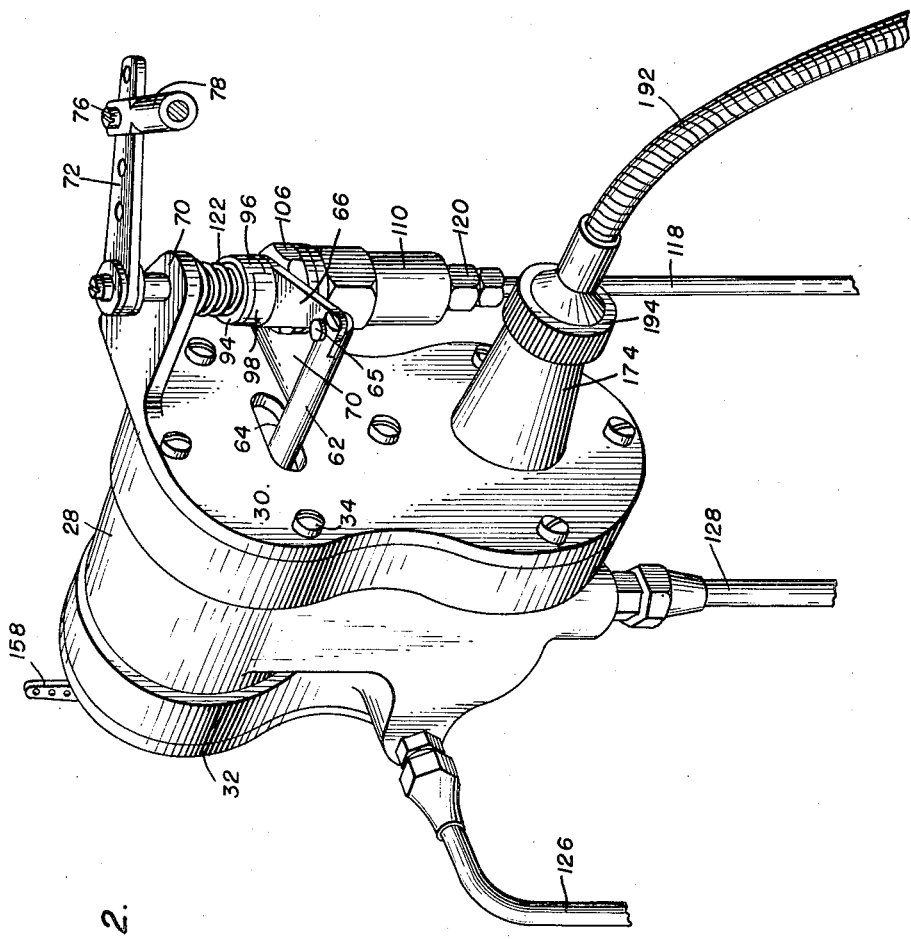
Figure 2 is an enlarged perspective view of the device shown in Figure 1 and taken from one side thereof.

As shown best in Figures 2, 3 and 7, the connecting rod 62 is pivotally connected as at 65 with a crank arm 66 which is journaled upon a shaft 68, see Figures 7 and 8, this shaft being vertically journaled in a bracket formed by laterally extending integral lugs 70 from the head cover 30.

Connected to the upper end of the shaft 68, in a manner to be subsequently set forth, is an operating lever arm 72 non-rotatably secured to the shaft and provided with a plurality of spaced apertures 74 which may be selectively engaged by a pivot pin 76 carried by a clevis 78 having an extending rod 80 which, as shown in Figure 1, is provided with a ball and socket type of swivel connection 82 with a link 84 connected to the bell crank 18 operating the throttle valve. It may thus be seen that as the piston 58 is reciprocated in the cylinder 54, in a manner to be subsequently set forth, the associated linkage will operate the throttle valve through the bell crank 18, to any predetermined position, thereby regulating and controlling the speed of the engine and of the vehicle.

Attention is now directed more specifically to Figures 7–9 for a better understanding of the shaft 68 and its functions. As shown best in Figure 8, the upper end of the shaft 68 is provided with a flange 86 and an axial shoulder portion 88 which may be of square cross section and which is received in a correspondingly shaped aperture 90 in the end of the lever 72. The lever is thus non-rotatably fixed upon the shaft 68 and is retained thereon as by a fastening means 92 such as a screw threadedly engaging the boss 88.

Intermediate its ends, the shaft 68 is provided with a collar or disk 94 suitably secured thereto and having a downwardly extending segmental jaw portion 96 formed integral therewith, this jaw forming part of a clutch adapted to have a rotary lost motion engagement with a complementary clutch jaw 98 carried by the upper surface of lever 66. As will be seen by reference to Figure 9, movement of the lever 66 in a counter-clockwise direction causes its clutch jaw 98 to engage and impart rotation to the jaw 96 thereby producing rotation of the shaft 68 and actuating the carburetor throttle valve as above set forth. Obviously, a clockwise rotation of the arm 66 merely causes the jaw 98 to disengage the jaw 96, without imparting rotation to the shaft 68. By this means, the shaft 68 may be caused to rotate in a counter-clockwise rotation, as by means of operation of the carburetor throttle valve by the conventional foot accelerator pedal or the like, whereby the jaw 96 will withdraw from the jaw 98 without imparting rotation to the arm 66.

The lever 66 has its hub portion 100 extended and provided with an annular ring or groove 102 at the lower end thereof, which is adapted to seat a locking ring 104 of known type, by means of which the lever 66 and sleeve 100 may be detachably secured in the bore of a bushing 106, which is screw threaded externally at its lower end as at 108 and extending through the lower flange or lug 70 detachably engages a correspondingly internally threaded portion of a housing 110. Thus, by tightening the bushing or gland 106 upon the housing 110, the latter is clamped securely to the lowermost of the flanges 70 for securely supporting the housing thereon.

The housing 110 is provided with an internal bore or chamber 112 into which the rod 68 extends, this rod terminating in a plunger or piston 114, of any suitable type, which is slidable vertically in the chamber 112. At its lower end, the chamber 112 is provided with a port 116 which is in communication with a conduit 118 as by a connection 120.

The arrangement is such that the spring 122 normally forces the plunger 114 and the shaft 68 downwardly into its lowermost position, during which the collar 94 bearing upon the upper surface of the arm 66 forces the latter into seating engagement upon the upper surface of the bushing 106, with the plunger 114 in the lowermost position in the chamber 112. In this position, the clutch jaws 96 and 98 are in their operative positions. When now, a pressure fluid is applied by means of the conduit 118 to the interior of the chamber 112 below the plunger 114, the latter is forced upwardly against the action of spring 122, whereupon the collar 94 and clutch jaw 96 are elevated above the clutch jaw 98 of the lever 66, to thereby disengage the clutch, and disconnect the operative engagement between the connecting rod 62 and the throttle valve actuating lever 72. In this position, the lever 66 may be freely rotated or oscillated by the connecting rod 62, as the piston 58 is reciprocated within its fluid pressure cylinder 54, without imparting movement to the linkage controlling or operating the throttle valve of the engine. As shown best in Figure 1, the conduit 118 is in direct connection with a T coupling 124 at any suitable point in the hydraulic brake line 24, whereby upon actuation of the brakes, a pressure impulse will be imparted to the casing 110, to actuate the plunger 114 and thereby disengage the speed governor from its operative connection with the engine throttle valve. Thus, when it becomes necessary to stop or slow the vehicle, as in an emergency, the mere application of the brakes will be sufficient to disengage the speed governor from the engine; and upon release of the brakes, the spring 122 will again restore the connection of the speed governor to the engine throttle valve.

As shown best in Figure 1, a conduit 126 is provided which is connected with the pressure side of the engine lubricating pump, or any other suitable source of fluid pressure, while the return conduit 128 is provided for returning the pressure fluid back to the crank case, or other source of supply. The conduit 126 is connected to the side wall of the casing 28, while conduit 128 communicates through a port 130 with the lower portion of the chamber 56.

As shown in Figure 4, the chamber 56 is formed by a bore which extends from the head of the casing 28 and which terminates in a reduced bore 132 extending through the rear end of the casing 28 and receives the previously mentioned sleeve 44 therein, as by means of screw threads 134. The conduit 126 communicates with a laterally extending passage 136 formed in the casing 28 which latter passage extends into and intersects the bore 132 intermediate its ends, and communicates with a port 138 formed in the sleeve 44. By this means, fluid pressure is constantly supplied to the internal bore of the sleeve 44. As shown in Figure 4, a longitudinally spaced outlet port 140 is provided in the bushing 44, which latter port communicates with a passage 142 which in turn communicates with a longitudinally extending passage 144. The latter intersects a channel 146 formed in the rear cover plate 32, which channel emerges into the fluid pressure chamber 54. A third lateral bore or port 146 is provided in the bushing 44 which port freely communicates with the interior of the chamber 56 and with the discharge port 130 therefrom.

Freely slidable in the bushing 44 is a reciprocating piston valve or plunger 148 which is resiliently urged in one direction as by a coil spring 150 disposed between one end of the valve and between an adjustable abutment 152 slidable in the outer end of the bushing sleeve 44. At its outer extremity, the bushing 44 is provided with a longitudinal slot 154 through which extends the end 156 of a lever 158 pivotally mounted as at 160 upon a fulcrum support carried by the above mentioned projection 52. The other end or arm 158 of the lever is provided with a plurality of apertures 162 through which may be selectively connected a Bowden wire cable indicated diagrammatically at 164 in Figure 1. By this means, the lever arm 158 may be manually operated from within the motor vehicle, and by the Bowden wire cable 164. The lever in turn adjusts the pressure or compression of the spring 150 by means of the slidable abutment 152, and thereby controls the resilient pressure urging the valve 148 towards the left in Figure 4, in which position the engine throttle valve is urged towards its opening position.

The control or piston valve 148 is provided with a pair of longitudinally spaced reduced portions 166 and 168 separated by a flange or enlargement 170 therebetween. The spacing of the parts and proportioning thereof is such that when the valve is in its right hand position as viewed in Figure 4, the reduced portion 166 defines an annular channel establishing communication between the conduits 142 and 128, thus connecting the pressure chamber 54 with the pressure release line 128. When the valve 148 is moved towards the left as viewed in Figure 4, the reduced portion 168 is caused to register with conduits 142 and port 138, thereby establishing communication between the actuating chamber 54 and the source of fluid pressure through the line 126.

A drainage passage 172 formed in the plunger 148 and running through substantially the length thereof, is adapted to discharge any fluid leaking by the seals or packings at the right end of the piston valve 148, into the interior of chamber 56 from which it is withdrawn by the above mentioned discharge conduit 128.

It will thus be seen that during its reciprocation, the valve 148 selectively establishes communication between the fluid pressure actuating chamber 54 and the fluid pressure supply through the conduit 126, ports 138 and conduit 142, and with the fluid discharge conduit 128, through the conduits 142, 144, and ports 146 and 130.

Attention is now directed more specifically to the means reciprocating the fluid control valve 148 in accordance with speed variations of the engine. The cover plate 30 of the casing 28 is provided with an integral outwardly extending tubular sleeve or boss 174, within which is journaled as by means of bearings 176, a shaft 178. The shaft 178 extends within the chamber 56 and has fixedly secured thereto within said chamber a lateral member 180 upon whose terminals are pivoted a pair of centrifugal governor weights 182 provided with actuating lugs or fingers 184 which are engageable with a bearing 186 carried by the extremity of the piston valve 148. The arrangement is such that as the shaft 178 is rotated, centrifugal force causes pivotal movement of the governor weights 182, whereby the fingers 184 engaging the bearing 186 urge the valve 148 inwardly of the sleeve 44 against the opposition of spring 150. Obviously, by properly adjusting the tension of spring 150 by means of sliding abutment 152, the valve 148 may be so adjusted that in response to a predetermined speed of rotation of shaft 178, the valve may be caused to admit fluid pressure to the chamber 54, thereby operating piston 58 and associated linkage to open the throttle valve of the engine. For this purpose, the outer extremity of shaft 178 is provided with a squared axial extension 188 in a detachable manner by a flexible cable 190, see Figure 3, in a flexible housing 192. This housing is detachably connected as at 194 with the screw threaded extremity 196 of the boss 174, and at its other end is detachably connected as at 198, see Figure 1, to any suitable engine driven shaft, such as the armature of the generator 14. Thus, the flexible cable 190, and shaft 178 are driven at a speed directly proportional to the speed of the engine and hence of the motor vehicle. Accordingly, the piston valve 148 is actuated in accordance with speed changes between certain limits, of the vehicle and engine, which limits may be regulated by adjusting the position of the sliding abutment 152 and thereby the compression of the spring 150.

It is to be clearly understood that although the invention has been shown as employing fluid pressure from the lubricating system for actuating the control piston, obviously any other fluid pressure or engine developed force may be employed, such as water pump pressure, intake suction, exhaust pressure or the like. To employ these various alternative equivalent pressures, it would merely be necessary to calibrate the range of movement of the mechanism to correspond to the pressures involved, and to give the requisite properly timed movement to the throttle valve actuating linkage.

Further, the speed responsive actuating mechanism for the control valve could readily be energized by any other speed responsive means, such as the engine fan, or any other accessory shaft, the application to a generator being shown as being a convenient source from which power may be taken and which is responsive to the speed of the engine. The operation of the device is as follows. The manual adjusting means 164 is set in a predetermined position, thereby imposing the necessary tension upon the spring 150 for adjusting the governor to maintain a predetermined speed of the engine and vehicle.

When so adjusted, the spring 150 urges the valve 148 to the left as best seen in Figure 4, and causes fluid pressure to flow from its source through 126, 136, 138, 168, 140, 142, 144, and 146 into the actuating chamber 54, thus forcing the piston 58 and connecting rod 62 outwardly. Now as best shown in Figure 8, the outward movement of connecting rod 62 mentioned above will cause the arm 66 to rotate counterclockwise about its axis and its rotating motion will be transmitted to the shaft 68 by the lug 98 being in contact with the jaw 96. This counterclockwise rotation of shaft 68 rotates the arm 72 and through the linkage mentioned before advances the throttle of the engine against the tension of the spring 20.

The increase of engine speed resulting from the advancing of the throttle described in the sequence above is imparted to the governor weights 182, see Figure 4, through the flexible cable 190 and the shaft 178. The increased speed of rotation of the governor weights 182 causes them to move outwardly of their axis of rotation and thus forces the valve 148 to the right as viewed in Figure 4.

When the speed of rotation of the engine, and subsequently the speed of the governor weights 182 has attained the rate for which the tension of the spring 150 was adjusted, the outward movement of the governor weights 182 and the simultaneous movement to the right of the fingers 184 will have caused the valve 148 to have moved to such a position that the flange 170 completely blocks the port 140, thereby trapping the fluid in the actuating chamber 54 which will prevent the combined forces of springs 20 and 60 from closing the engine throttle 18.

Any variation of engine speeds caused by changing road conditions such as differences in grades, will result in an automatic positioning of the valve 148 and its flange 170 to establish communication between the actuating chamber 54 and an additional quantity of fluid under pressure to increase speed or establish a communication which will permit fluid already in the chamber 54 to be exhausted in order that the combined effort of springs 60 and 20 may close the engine throttle.

Since numerous modifications will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

What is claimed as new is as follows:

1. A speed governor for the throttle valve of an engine comprising a force actuated member, a linkage operatively connecting said member to a throttle valve, means for applying an engine developed force to said member, means controlling the application of said force to said member, and means adjusting said control means in response to engine speed, said linkage including a pair of concentric shafts, a lever on one of said shafts connected to said throttle valve and a lever on the other shaft connected to said actuated member and a pair of circumferentially spaced engagement means on said shafts for establishing a lost motion driving engagement therebetween, said one shaft being axially adjustable in said other shaft to selectively disengage said engagement means and said driving engagement, and means for selectively axially moving one of said shafts with relation to the other of said shafts.

2. A speed governor for an engine comprising a throttle valve, a fluid pressure actuated member, means connecting said member to said throttle valve including a linkage having two relatively movable members, each of said members including lugs engageable with each other, and hydraulically operated means selectively engaging and disengaging said connecting means comprising a housing for one of said movable members including a chamber attached thereto and a fluid supply means connected to said chamber, said movable members including a pair of concentric shafts, said lugs being circumferentially spaced on said shafts.

3. The combination of claim 2, wherein one of said shafts carries a piston slidable in said chamber.

4. The combination of claim 3, wherein said linkage includes a lever on said one of said shafts connected to said fluid pressure actuated member, and a lever on the other of said shafts connected to said throttle valve.

5. A speed governor for the throttle valve of an engine comprising a cylinder and a piston reciprocal therein, a linkage operatively connecting said piston to a throttle valve, means for applying an engine developed fluid pressure to said cylinder, a control valve controlling the application of said fluid pressure to said piston, and means adjusting said valve in response to engine speed, said linkage including a pair of concentric shafts, a lever on one of said shafts connected to said throttle valve and a lever on the other shaft connected to said piston, a pair of circumferentially spaced lugs on said shafts for establishing a lost motion driving engagement therebetween, one of said shafts being vertically adjustable in the other shaft to selectively disengage said lugs and said lost motion driving engagement, and means for selectively vertically moving said vertically adjustable shaft.

6. A speed governor for the throttle valve of an engine comprising a cylinder and a piston reciprocal therein, a linkage operatively connecting said piston to a throttle valve, means for applying an engine developed fluid pressure to said cylinder, a control valve controlling the application of said fluid pressure to said piston, and means adjusting said valve in response to engine speed, said linkage including a pair of concentric shafts, a lever on a first of said shafts connected to said throttle valve and a lever on the second shaft connected to said piston, a pair of circumferentially spaced lugs each positioned on one of said shafts for establishing a lost motion driving engagement therebetween, said first shaft being vertically adjustable in said second shaft to selectively engage and disengage said lugs and said lost motion driving engagement, a chamber coaxial with and secured to said second shaft, a piston carried by said first shaft and slidable in said chamber, and fluid supply means connected to said chamber for selectively moving said piston relative to said chamber to selectively move said first shaft relative to said second shaft.

7. A speed governor for an engine comprising a throttle valve, a fluid pressure actuated member, means connecting said member to said throttle valve including a linkage having two relatively movable members, each of said movable members including lugs engageable with each other, and hydraulically operated means selectively rendering said connecting means inoperative, said hydraulically operated means including a chamber secured to one of said members, a piston secured to the other of said members and slidable within said chamber, and fluid supply means connected to said chamber for selectively moving said piston relative to said chamber.

E V ROBNETT, JR.

REFERENCES CITED

The following references are of record in the file of this patent:

UNITED STATES PATENTS

| Number | Name | Date |
| --- | --- | --- |
| 1,579,161 | Stacey | Mar. 30, 1926 |
| 2,167,110 | Gutenberg et al. | July 25, 1939 |
| 2,227,174 | Baster | Dec. 31, 1940 |
| 2,230,742 | Bush | Feb. 4, 1941 |
| 2,260,576 | Maybach | Oct. 28, 1941 |
| 2,283,478 | Warren | May 19, 1942 |
| 2,284,380 | Drabble | May 26, 1942 |
| 2,443,084 | Rhodes | June 8, 1948 |